United States Patent Office 3,455,493
Patented July 15, 1969

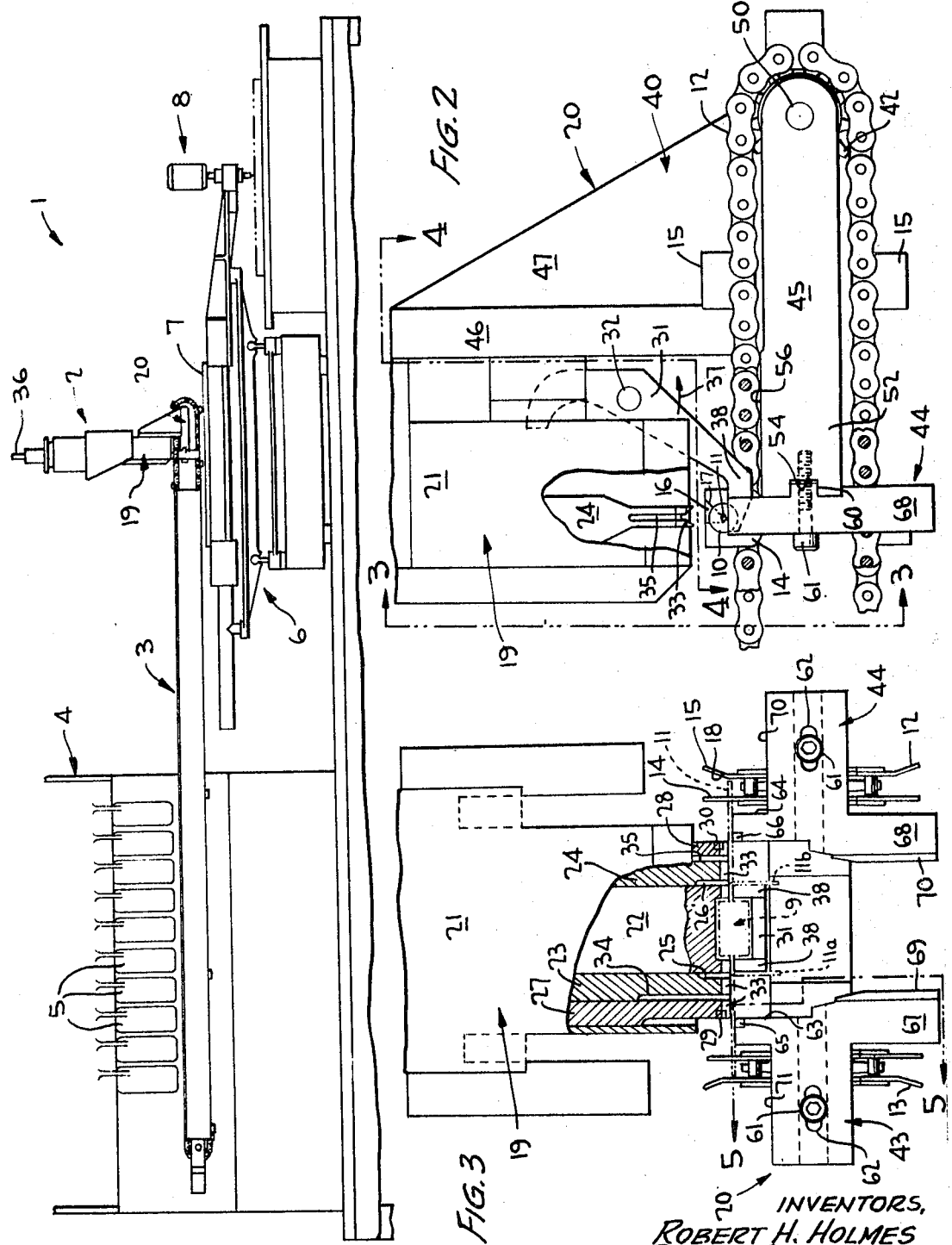

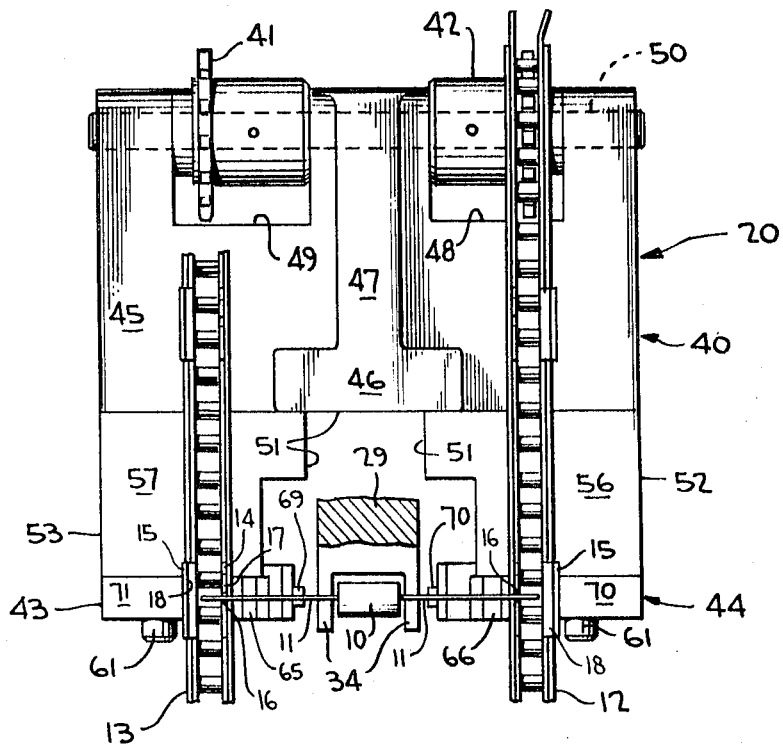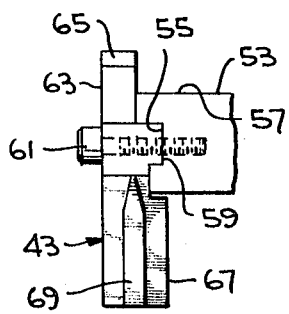

3,455,493
COMPONENT SEQUENCING AND INSERTION APPARATUS
Daniel W. Ackerman, Binghamton, Robert H. Holmes, Marathon, and Phillip A. Ragard, Binghamton, N.Y., assignors to Universal Instruments Corporation, Binghamton, N.Y., a corporation of New York
Filed Feb. 27, 1967, Ser. No. 618,922
Int. Cl. B25c 5/04, 5/08, 3/04
U.S. Cl. 227—90                                    10 Claims

ABSTRACT OF THE DISCLOSURE

An electrical component sequencing and insertion apparatus having a shear block holder assembly which permits the utilization of an endless conveyor for feeding axial lead components in a predetermined sequence from a supply of components to a component lead cutting, bending and insertion machine.

---

Heretofore various means have been proposed for use in supplying axial lead components to component insertion machines. In this respect it has been proposed in U.S. Patent 2,896,213 to supply a component lead cutting, bending and insertion machine with axial lead components belted together by pairs of spaced tapes. Also, it is known to employ a gravity feed chute to supply axial lead components arranged in a predetermined sequence to an insertion machine, as evidenced by U.S. Patent 2,902,689. More recently, it has been proposed in U.S. Patent 3,074,-666 to provide means to push axial lead components along a trough guide from a component supply to a point adjacent to an insertion machine.

However, so far as we are aware, no prior art axial lead component insertion machine has been adapted for use in combination with an endless component conveyor. By employing an endless conveyor to feed components from a sequencing supply to an insertion machine, we are able to both omit a separate component handling step, such as tape or magazine packaging, and to positively and accurately control positioning of sequentially presented axial lead components adjacent to a component lead cutting, bending and insertion machine in a manner not heretofore possible. Additionally, utilization of an endless conveyor feed permits ready access by an operator to the components passing to the insertion machine for purposes of visual inspection and permits, if desired, final electrical testing of the components immediately prior to the insertion thereof.

These and other advantages of the present invention will now be more fully described with reference to the accompanying drawings, in which:

FIG. 1 is a diagrammatic view showing the component sequencing and insertion apparatus of the present invention;

FIG. 2 is a fragmentary enlarged front elevation view of the insertion machine showing in detail the shear block holder assembly;

FIG. 3 is a sectional view taken generally along the line 3—3 of FIG. 2, but showing the insertion head in partially actuated position;

FIG. 4 is a sectional view taken generally along the line 4—4 of FIG. 2; and

FIG. 5 is a sectional view taken generally along the line 5—5 of FIG. 3.

The axial lead component sequencing and inserting apparatus of the present invention is generally designated as 1 and shown diagrammatically in FIG. 1 as including an insertion machine 2; an endless conveyor 3; an electrical component supply 4 having a plurality of component dispensers 5; and an assembly 6 which is adapted to movably support a circuit or wiring board 7 in component lead receiving position beneath insertion machine 2. Preferably, a pantograph device 8 is employed to control movement of assembly 6 and actuate a suitable apparatus control circuit, not shown, which in turn controls operation of insertion machine 2, conveyor 3 and supply 4. Any suitable mechanism, not shown, may be provided below circuit board 7 in vertical alignment with insertion machine 2 for the purpose of bending and clinching the leads of a component inserted downwardly through the circuit board by the insertion machine. The structure of assembly 6 and pantograph 8 are conventional and form no part of the present invention.

The component supply 4 employed in the practice of the present invention is preferably of the type disclosed in copending application Ser. No. 514,963, filed Dec. 20, 1965, now Patent No. 3,421,284, wherein a memory unit, not shown, is employed to operate dispensers 5, so as to deposit desired components 9, shown in FIGS. 2, 3 and 4 as having a body portion 10 and leads 11 extending axially therefrom in a predetermined sequence.

While conveyor 3 may also be of the type disclosed in above mentioned patent application Ser. No. 514,963, we prefer to employ the link chain conveyor illustrated in FIGS. 2, 3 and 4. Conveyor 3 is shown as being formed by front and rear endless elements in the form of link chains 12 and 13 which include alternating roller and pin links. It will be seen that every fourth roller link of each chain is provided with oppositely disposed component positioning assemblies including vertically extending inner and outer plates 14 and 15, respectively. Inner plates 14 are provided with vertically extending slots 16, which are shown particularly in FIGS. 2 and 4 as tapering rearwardly to form lead guide surfaces 17. Outer plates 15 are shown in FIG. 3 as having their free ends bent outwardly to form lead end guide surfaces 18. It will be understood that when one of the dispensers 5 is actuated to permit a component to drop onto conveyor 3, guide surfaces 17 and 18 are adapted to engage the sides and ends of component leads 11, respectively, to guide the leads into position within slots 16, whereafter the inwardly facing vertically surfaces of outer plates 15 engage the ends of leads 11 to prevent axial motion of the component transversely of the conveyor. Any suitable means, not shown, may be employed to power the conveyor, so long as it is adapted to accurately position slots 16 beneath insertion machine 2 in a stepwise manner.

Insertion machine 2 is shown particularly in FIGS. 2 and 3 as including an insertion head, generally indicated as 19 and a shear block holder assembly, generally indicated as 20.

Insertion head 19 is preferably of the type disclosed in U.S. Patent 2,896,213 and thus will now be only briefly referred to in order to facilitate understanding of the present invention. In FIGS. 2 and 3 insertion head 19 is shown as including a casing 21; a driver 22; a pair of outside formers 23, 24 having vertically extending lead slot guides 25 and 26; a pair of cutoff bars 27, 28 having lead severing carbide inserts 29, 30; and an inside former 31, which is pivotably supported on casing 21, as by pin 32. Driver 22, outside formers 23, 24 and bars 27, 28 are each provided with inverted V-shaped slots 31, 33 adjacent the lower ends thereof for the purpose of receiving and positioning component leads 11. By again referring to FIGS. 2 and 3 it will be seen that for the reason hereinafter discussed the basic structure of the insertion head described in Patent 2,896,213 has been modified by providing the outside formers 23 and 24 with vertically extending guide follower slots 34, 35. If desired the insertion head may be further modified by employing the outside forms as both lead severing and bending parts.

As more fully explained in U.S. Patent 2,896,213 formers 23, 24 and bars 27, 28 are adapted to be reciprocated vertically downwardly from their initial up position, indicated in the case of outside former 24 in FIG. 2, by an activating rod 36, as shown only in FIG. 1. Rod 36 may be actuated by a suitable pneumatic air cylinder, not shown. Also, it will be understood that upon continued downward movement of driver 22 from its partially down position, illustrated in FIG. 3, means, not shown, are adapted to pivot inside former 31 in the direction indicated in FIG. 2 by arrow 37 to remove the component lead supporting arms 38 of inside former 31 away from their component lead suporting position beneath driver 22.

The shear block holder assembly 20, which forms the principal feature of the present invention, is shown in FIGS. 2, 3, and 4 as comprising a bracket 40 upon which are mounted a pair of conveyor chain guide sprockets 41, 42 and a pair of shear blocks 43, 44. Similar sprockets in combination with a suitable conveyor chain tension adjustment, not shown, may be supported adjacent compact supply 4 for the purpose of guiding the other end of conveyor 3.

Bracket 40 is shown particularly in FIGS. 2 and 4 as being in the form of a metal casting having an integrally formed base portion 45, a riser portion 46 and a reinforcing web portion 47, and as being mounted on head casing 21, as by screws, not shown, passing through riser portion 46. Again referring to FIGS. 2 and 4, it will be seen that portion 45 is cut out at 48 and 49 to receive sprockets 42, 41 which are rotatably supported on the bracket base by shaft bearing 50. The other end of base portion 45 is cut out at 51 to permit free movement of the insertion head parts and to form shear block supporting projections 52, 53 which are provided with aligned horizontally extending slots 54, 55 and slightly elevated, smooth upper surface portions 56, 57, respectively. Surfaces 56, 57 are employed to slidably support conveyor 3 to prevent sagging thereof and thus insure proper vertical positioning of component leads 11, as the components are presented to the insertion machine.

Shear blocks 43 and 44 are adjustably mounted on base projections 52, 53 by means of block ribs 59, 60, which are slidably received within projection slots 54, 55, and clamping screws 61, which pass through shear block slots 62 and are threadably received within the bracket base projections. Shear blocks 43, 44 are formed with upwardly projecting pedestal portions 63, 64, which are provided with lead severing carbide inserts 65, 66, adapted to cooperate with cutoff bar inserts 29 and 30; and with depending flange portions 67, 68 having vertically extending tapered rib guides 69, 70, which are adapted to cooperate wtih slots 34, 35 of outside formers 23, 24 during movement of the latter downwardly from the position illustrated in FIG. 3. Preferably, upper surface portions 71, 72 of shear blocks 43, 44 are formed coplanar with bracket surface portions 56, 57 to assist in maintaining proper vertical positioning of the conveyor adjacent to the pedestal severing inserts 65, 66. By mounting the shear blocks on bracket 40 in the manner described, accurate positioning of shear inserts 65, 66 and guides 69, 70 with respect to insertion head 19 may be effected.

During operation of the apparatus of the present invention, pantograph device 8 is manually or mechanically moved in a stepwise manner along a preselected trace or pattern of the circuit to be fabricated, whereby the circuit board 7 is moved by assembly 6 in a step-wise manner with respect to insertion head 2 sequentially into a plurality of component receiving positions. Upon each movement of the pantograph to a new position the electrical and pneumatic control circuits of the apparatus, not shown, are actuated to produce the following events.

First, the memory unit of component supply 4 is stepped to permit one of dispensers 5 to deposit one component of a desired predetermined sequence of components onto conveyor 3; the desired sequence of components being determined by the number, type and the position of the electrical components present in the circuit traced by the pantograph. Thereafter, conveyor 3 is stepped to position a component beneath insertion head 19 with the leads 11 of such component disposed immediately above inserts 65, 66 of shear blocks 43, 44; the component so positioned corresponding in type to that element of the circuit indicated by the instant position of the pantograph. It will be apparent that one or more complete series of components may be disposed on the conveyor at any given time and that as one component is removed from the leading series of components, a component is dispensed from supply 4 onto the conveyor to form a new series. Immediately after positioning of a component adjacent to the insertion machine, rod 36 is actuated to effect downward movement of insertion head parts including driver 22, outside formers 23, 24 and cutoff bars 27, 28. Immediately following movement of the insertion head parts below the position illustrated in FIG. 3, component leads 11 are aligned by inverted V-shaped guide slots 33 and thereafter severed or trimmed to a desired length by severing inserts 65, 66 and 29, 30 carried on the shear blocks and cutoff bars, respectively, and the portions of the leads disposed adjacent to component body portion 10 are clamped between driver 22 and arms 38 of inside former 31. Thereafter, outside formers 23, 24 move relative to the driver and inside former, so as to deform the trimmed component leads, as indicated in phantom at 11$a$, 11$b$ in FIG. 3, and frictionally grip the thus formed leads within vertically extending guide slots 25, 26. Movement of the cutoff bars is then arrested and the inside former pivoted from its lead supporting position, illustrated in FIGS. 2–3, as the outside formers and driver are forced into their down or component insertion position, not shown. Accurate positioning of the outside formers, and thus the component leads with respect to the circuit board, during movement thereof into lead insertion position is maintained by shear block rib guide 69, 70, which are slidably received within outside former follower slots 34, 35. After leads 11$a$, 11$b$ are inserted into circuit board 7, a suitable mechanism is actuated to clinch such leads to the underside of the circuit board, and the insertion head parts are returned to their initial or up position, thereby resetting the control circuit of the apparatus.

Obviously, any suitable control circuit may be employed in the practice of the present invention and may include suitable switching arrangements responsive to the movement of the insertion head parts to indicate completion of each insertion cycle. Further, if desired a suitable numerical control system may be substituted for the pantograph.

Having described in detail one specific embodiment of the axial lead sequencing and insertion apparatus of the present invention, various modifications thereof will become apparent to one skilled in the art, and, therefore, we wish to be limited only as indicated in the appended claims.

What is claimed is:

1. An axial lead component sequencing and insertion apparatus including a component insertion head having parts adapted to be moved vertically to effect severing, bending and insertion of component leads; a conveyor having a pair of endless elements adapted to lead support, axial lead components at a plurality of points spaced along the conveyor; a component supply adapted to deposit axial lead components onto said conveyor adjacent one end thereof in a predetermined sequence; and a shear block holder assembly adapted to support the other end of said conveyor for travel beneath said insertion head to permit said insertion head to process components carried on said conveyor; said assembly comprising bracket means adapted to be mounted adjacent said insertion head; a pair of sprockets mounted on said bracket and adapted to support and maintain said conveyor elements in transversely spaced relationship during travel thereof beneath said insertion head; and a pair of shear blocks mounted on said bracket and having spaced surfaces disposed between said conveyor elements adapted to co-cooperate with said insertion head severing parts to sever leads of a component positioned by said conveyor beneath said insertion head.

2. The apparatus according to claim 1, wherein each of said shear blocks includes a pedestal portion having a carbide insert defining said lead severing surface of said block; a depending portion having a vertically extending tapered guide rib adapted to be received within a vertically extending follower slot provided in one of said insertion parts of said insertion head during movement thereof to a lead insertion position; and a smooth upwardly facing surface portion adapted to slidably support one of said conveyor elements during movement thereof adjacent said shear block pedestal portion.

3. The apparatus according to claim 1, wherein said conveyor elements include vertically extending lead end positioning surfaces adapted to prevent movement of components transversely of said conveyor.

4. An axial lead component sequencing and insertion apparatus including a component insertion head having parts adapted to be moved vertically to effect severing, bending and insertion of component leads; a conveyor having a pair of spaced endless elements adapted to lead support axial lead components at a plurality of points spaced along the conveyor; a component supply adapted to deposit axial lead components on said conveyor adjacent one end thereof; and means adapted to guidingly support the other end of said conveyor for travel beneath said insertion head, whereby upon movement of said conveyor one component at a time is placed beneath said insertion head in position to be processed thereby, said conveyor guiding means including severing means adapted to cooperate with said lead severing parts of said insertion head to effect severing of the leads of said one component upon vertical movement of said severing parts.

5. A shear block holder assembly for use in passing a conveyor including spaced endless elements adapted to lead support axial lead components in operable relationship to an axial lead component insertion head having parts adapted to be moved vertically to effect cutting, bending and insertion of component leads, which assembly comprises bracket means adapted to be mounted adjacent said insertion head; a pair of sprockets mounted on said bracket and adapted to maintain said conveyor elements in transversely spaced relationship for passage beneath said insertion head; a pair of shear blocks adapted to be mounted on said bracket in spaced apart relationship, said blocks having spaced surfaces disposed between said conveyor elements and adapted to cooperate with severing parts of said insertion head to sever leads of a component positioned by said conveyor beneath said insertion head.

6. The assembly according to claim 5, wherein said shear blocks are provided with spaced vertically extending guide ribs having tapered upper end portions, said ribs being adapted to be received within vertically extending follower slots provided in lead insertion parts of said insertion head during movement thereof to a lead insertion position.

7. The assembly according to claim 5, wherein said bracket is provided with upwardly facing smooth surfaces adapted to slidably support said conveyor elements adjacent said shear blocks, whereby the leads of a component supported by said conveyor are adapted to be maintained in a predetermined vertical relationship with respect to said lead severing surfaces of said shear blocks.

8. The assembly according to claim 7, wherein said shear blocks are provided with upwardly facing conveyor element supporting surfaces coplanar with said smooth surfaces of said bracket.

9. The assembly according to claim 5, wherein said bracket is in the form of an integrally formed metal casting including a horizontally extending base portion and an upstanding portion adapted to be affixed to said insertion head, said base portion having means adjacent one end thereof to support said sprockets for rotation about a horizontally disposed axis, said base portion being slotted adjacent the other end thereof to permit vertical movement of said insertion parts and to form a pair of shear block supports, each of said shear block supports having smooth upper surface portions adapted to slidably support said conveyor elements during movement thereof adjacent said shear blocks, and said shear blocks each including a pedestal portion having a carbide insert defining one of said severing surfaces, a depending portion having means adapted to guide one of said insertion parts of said insertion head during movement thereof to a lead insertion position, and a smoothly upwardly facing surface portion disposed relatively outwardly from said pedestal portion and coplanar with said smooth upper surface portions of said shear block supports.

10. The assembly according to claim 9 wherein said shear blocks are mounted on said supports to permit adjustment thereof transversely of said conveyor elements.

References Cited

UNITED STATES PATENTS 2,298,955 10/1942 Mason et al. _____ 83—409
3,187,972 6/1965 Shann _____ 227—90

BERNARD STICKNEY, Primary Examiner

U.S. Cl. X.R.

83—155, 409